(12) United States Patent
Matsumoto et al.

(10) Patent No.: US 8,797,711 B2
(45) Date of Patent: Aug. 5, 2014

(54) ELECTRONIC COMPONENT AND PRODUCING METHOD THEREOF

(75) Inventors: Seiichi Matsumoto, Nagaokakyo (JP); Toshiyuki Iwanaga, Sabae (JP); Makoto Ogawa, Fukui (JP); Akihiro Motoki, Fukui (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 371 days.

(21) Appl. No.: 12/632,823

(22) Filed: Dec. 8, 2009

(65) Prior Publication Data

US 2010/0157507 A1    Jun. 24, 2010

(30) Foreign Application Priority Data

Dec. 24, 2008    (JP) ................................. 2008-327456

(51) Int. Cl.
*H01G 4/228* (2006.01)
(52) U.S. Cl.
USPC ..................... 361/306.3; 361/303; 361/306.1; 361/321.2; 361/311
(58) Field of Classification Search
CPC .......... H01G 4/005; H01G 2/00; H01G 4/38; H01G 4/228; H01G 4/33; H01L 23/642; H01L 2224/16; H01L 41/083; H05K 1/0231
USPC ................ 361/306.3, 303, 306.1, 321.2, 311; 205/67, 69, 80, 70, 82, 87, 95, 334; 427/79–81; 29/25.35
See application file for complete search history.

(56) References Cited

U.S. PATENT DOCUMENTS

| | | | |
|---|---|---|---|
| 6,960,366 B2 | 11/2005 | Ritter et al. |
| 6,972,942 B2 | 12/2005 | Ritter et al. |
| 6,982,863 B2 | 1/2006 | Galvagni et al. |
| 7,067,172 B2 | 6/2006 | Ritter et al. |
| 7,152,291 B2 | 12/2006 | Ritter et al. |
| 7,154,374 B2 | 12/2006 | Ritter et al. |
| 7,161,794 B2 | 1/2007 | Galvagni et al. |

(Continued)

FOREIGN PATENT DOCUMENTS

| | | |
|---|---|---|
| JP | 63-169014 A | 7/1988 |
| JP | 06-069061 A | 3/1994 |

(Continued)

OTHER PUBLICATIONS

Official Communication issued in corresponding Chinese Patent Application No. 200910266383.6, mailed on Oct. 27, 2011.

(Continued)

*Primary Examiner* — Robert J Hoffberg
*Assistant Examiner* — Hung Dang
(74) *Attorney, Agent, or Firm* — Keating & Bennett, LLP (57) ABSTRACT

A region where a plating film constituting an external electrode is formed can be accurately controlled in an electronic component in which the external electrode is formed by directly plating a particular region in a surface of a component body. In a component body, a bump is provided in a position in which a region where an external electrode should be formed is partitioned. In a plating process, growth of the plating film constituting the external electrode is substantially stopped or delayed in the bump. As a result, a termination point of the growth of the plating film constituting the external electrode can be accurately controlled in the position of the bump.

2 Claims, 5 Drawing Sheets

(56) References Cited

U.S. PATENT DOCUMENTS

| | | | |
|---|---|---|---|
| 7,177,137 | B2 | 2/2007 | Ritter et al. |
| 7,344,981 | B2 | 3/2008 | Ritter et al. |
| 7,345,868 | B2 | 3/2008 | Trinh |
| 7,463,474 | B2 | 12/2008 | Ritter et al. |
| 7,570,477 | B2 * | 8/2009 | Kayatani ............... 361/306.3 |
| 7,863,662 | B2 * | 1/2011 | Sato et al. ............... 257/295 |
| 2005/0046536 | A1 | 3/2005 | Ritter et al. |
| 2007/0014075 | A1 | 1/2007 | Ritter et al. |
| 2008/0123248 | A1 | 5/2008 | Kunishi et al. |
| 2008/0123249 | A1 | 5/2008 | Kunishi et al. |
| 2008/0158774 | A1 | 7/2008 | Trinh |
| 2008/0210564 | A1 | 9/2008 | Motoko et al. |

FOREIGN PATENT DOCUMENTS

| | | | | |
|---|---|---|---|---|
| JP | 10-097942 | * | 4/1998 | .......... H01G 2/20 |
| JP | 10-097942 A | | 4/1998 | |
| JP | 2005-277205 A | | 10/2005 | |
| WO | 2007/072617 A1 | | 6/2007 | |
| WO | WO 2008/001542 | * | 1/2008 | .......... H01G 4/30 |
| WO | 2008/059666 A1 | | 5/2008 | |

OTHER PUBLICATIONS

Official Communication issued in corresponding Chinese Patent Application No. 200910266383.6, mailed on Apr. 28, 2011.

Official Communication issued in corresponding Japanese Patent Application No. 2008-327456, mailed on Dec. 4, 2012.

* cited by examiner

FIG. 9

ELECTRONIC COMPONENT AND PRODUCING METHOD THEREOF

BACKGROUND OF THE INVENTION

1. Field of the Invention

The present invention relates to an electronic component and a producing method thereof, particularly to an electronic component in which an external electrode is formed by directly plating a particular region in a surface of a component body and a producing method thereof.

2. Description of the Related Art

For example, Japanese Patent Publication Laid-Open No. 63-169014 discloses a method for forming an external electrode of a laminated ceramic capacitor. More particularly, a component body included in the laminated ceramic capacitor is formed into a rectangular solid shape, the component body includes a pair of principal surfaces opposed to each other, a pair of side surfaces opposed to each other, and a pair of end surfaces opposed to each other, and end edges of internal electrodes are exposed onto the end surface. The external electrode is formed by electroless plating so as to short-circuit the end edges of the internal electrodes, which are exposed onto the end surface of the component body.

Japanese Patent Publication Laid-Open No. 63-169014 discloses a structure in which the external electrode is formed only on the end surface of the component body. However, the laminated ceramic capacitor in which the external electrode is formed only on the end surface of the component body is inferior to other laminated ceramic capacitors in a surface mounting property. In order to improve the surface mounting property, it is necessary to extend the external electrode to not only the end surface of the component body but also a portion adjacent to the end surface, the portion being part of each of the principal surface and the side surfaces.

When the external electrode is formed by directly plating the surface of the component body, a plating film can be grown on not only the end surface of the component body but also a portion adjacent to the end surface, the portion being part of each of a principal surface and a side surface, using a fast-growing plating solution and plating conditions. However, it is difficult to control end edges of turning portions in a desired position without generating variation at a growth point of the plating film, that is, in the principal surface and side surface of the component body.

Although the external electrode is formed by electroless plating in the technique disclosed in Japanese Patent Publication Laid-Open No. 63-169014, the same holds true for electrolytic plating.

SUMMARY OF THE INVENTION

In view of the foregoing, preferred embodiments of the present invention provide an electronic component in which a position of the end edge of the plating film constituting the external electrode can be successfully controlled and a producing method thereof, in a case where the external electrode is formed by directly plating the surface of the component body.

According to a preferred embodiment of the present invention, an electronic component includes a component body, and an external electrode that is disposed on a particular region in a surface of the component body, and in order to solve the above technical problems, the external electrode is formed by directly plating the surface of the component body, a bump is provided in a position where the particular region is partitioned in the surface of the component body, and an end edge of the external electrode is located in the bump.

In a preferred embodiment of the present invention, the bump may be formed while a wall surface of the bump substantially perpendicularly rises from the particular region in the surface of the component body to a predetermined height, or may be formed while a wall surface of the bump substantially perpendicularly falls from the particular region in the surface of the component body to a predetermined depth.

In the electronic component according to a preferred embodiment of the present invention, the component body is a substantially rectangular solid, the component body includes a pair of principal surfaces opposed to each other, a pair of side surfaces opposed to each other, and a pair of end surfaces opposed to each other, the external electrode is disposed on the pair of end surfaces and on a portion adjacent to the end surfaces, the portion being part of each of the principal surfaces and part of each of the side surfaces, and the bump is provided on the principal surface and the side surface so as to extend around the component body.

In the above preferred embodiment, more preferably, the component body has a laminated structure including a plurality of electric insulation layers and an internal electrode, the electric insulation layers being laminated while extended in a direction of the principal surface, the internal electrode being arranged along a particular interface between the electric insulation layers, the end edge of the internal electrode is exposed onto at least one of the end surfaces of the component body, and the external electrode is arranged such that the exposed end edge of the internal electrode is covered therewith.

Another preferred embodiment of the present invention is directed to a method for producing an electronic component, the electronic component including a component body and an external electrode formed on a particular region in a surface of the component body.

The electronic component producing method according to a preferred embodiment of the present invention includes a step of preparing the component body in which a bump is provided in a position, the particular region where the external electrode should be formed being partitioned at the position, and a plating step of directly plating the surface of the component body to deposit a plating film in the particular region, the plating film constituting the external electrode. The plating step includes a step of growing the plating film toward the bump and a step of substantially stopping or delaying the growth of the plating film in the bump.

In the electronic component producing method according to a preferred embodiment of the present invention, preferably, the component body is formed into a substantially rectangular solid, the component body includes a pair of principal surfaces opposed to each other, a pair of side surfaces opposed to each other, and a pair of end surfaces opposed to each other, the component body has a laminated structure including a plurality of electric insulation layers and an internal electrode, the electric insulation layers being laminated while extended in a direction of the principal surface, the internal electrode being formed along a particular interface between the electric insulation layers, the end edge of the internal electrode is exposed onto at least one of the end surfaces of the component body. The bump is provided on the principal surface and the side surface so as to extend around the component body. In the plating process, the plating film starts to deposit from the exposed end edge of the internal electrode while terminating the deposition in the bump, the exposed end edge of the internal electrode is covered with the plating film, and the plating film is formed on the pair of end surfaces and a portion adjacent to the end surfaces, the portion being part of each of the principal surfaces and part of each of the side surfaces.

According to a preferred embodiment of the present invention, the growth of the plating film constituting the external electrode is substantially stopped or delayed in the bump, so that the region where the plating film is formed can be controlled with good accuracy. When the electrolytic plating is adopted, it is not necessary to form an underlying conductive film for defining the region where the plating film is formed. When the electroless plating is adopted, it is not necessary to perform a catalytic treatment to the particular region. Therefore, cost reduction can be achieved in forming the external electrode.

When the electronic component includes a component body having a rectangular solid shape while the external electrode is formed on the pair of end surfaces and a portion adjacent to each end surface, the portion being part of each of the principal surface and side surface, the dimensional accuracy is enhanced in the turning portion of the external electrode on a portion of each of the principal surface and side surface, so that a surface mounting process for the electronic component can be performed with high accuracy and efficiency.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Figure 1:
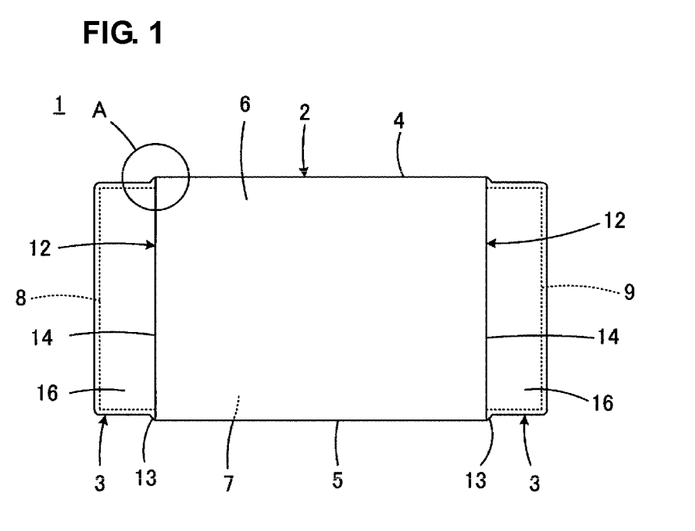
FIG. 1 is a front view illustrating an electronic component according to a first preferred embodiment of the present invention.
Figure 2:
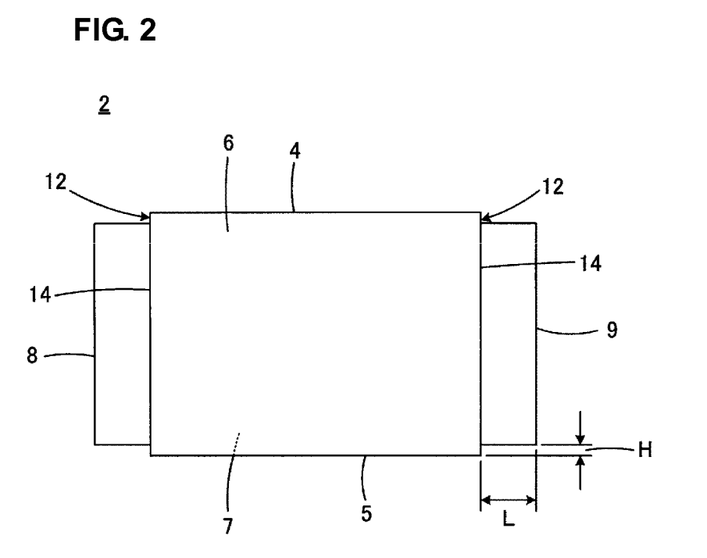
FIG. 2 is a front view illustrating a component body included in the electronic component of FIG. 1.
Figure 3:
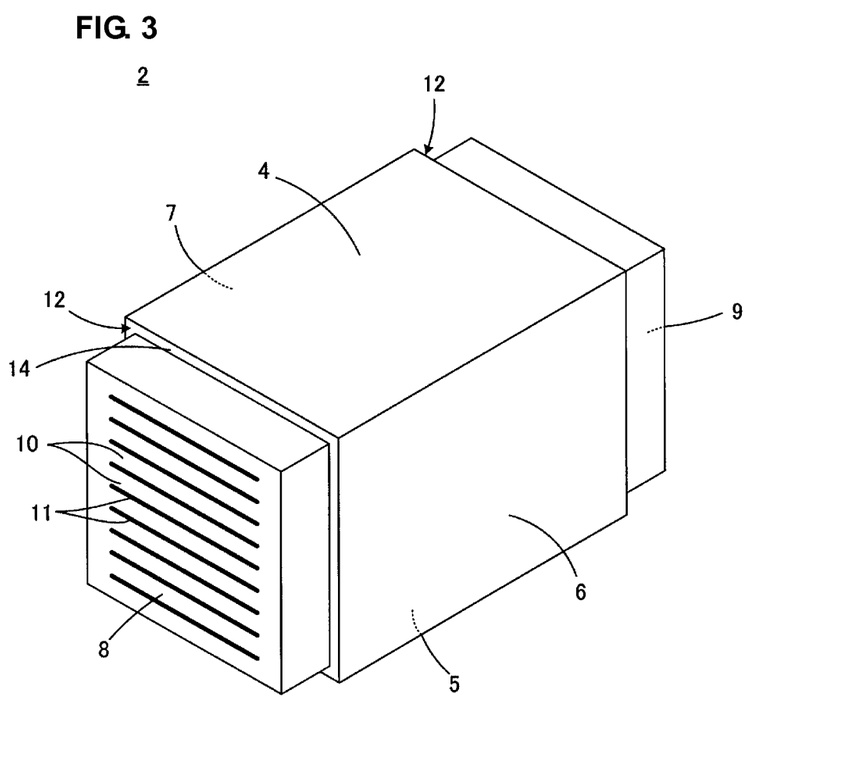
FIG. 3 is a perspective view of the component body of FIG. 2.
Figure 4:
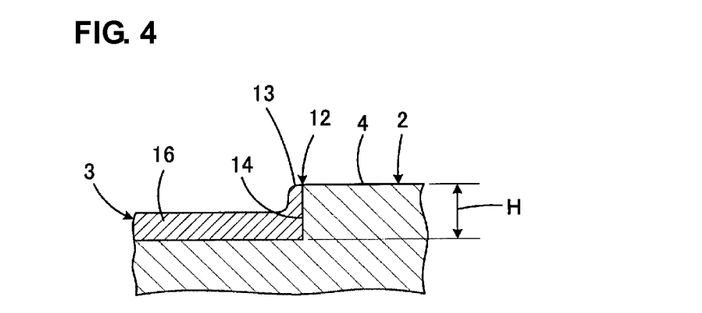
FIG. 4 is an enlarged sectional view of a portion of FIG. 1.

FIGS. 1 to 4 illustrate an electronic component according to a first preferred embodiment of the present invention. FIG. 1 is a front view illustrating an appearance of an electronic component 1, FIG. 2 is a front view illustrating a component body 2 included in the electronic component 1 before an external electrode of FIG. 1 is formed, and FIG. 3 is a perspective view of the component body 2 of FIG. 2, and FIG. 4 is an enlarged sectional view of a portion A of FIG. 1.

For example, the electronic component 1 constitutes a laminated ceramic capacitor. The component body 2 preferably has a substantially rectangular solid shape. The component body 2 includes a pair of principal surfaces 4 and 5 opposed to each other, a pair of side surfaces 6 and 7 opposed to each other, and a pair of end surfaces 8 and 9 opposed to each other.

As illustrated in FIG. 3, the component body 2 has a laminated structure including a plurality of dielectric ceramic layers 10 and a plurality of internal electrodes 11. The dielectric ceramic layers 10 are of a plurality of electric insulation layers that are laminated while extended in directions of principal surfaces 4 and 5. The internal electrodes 11 are arranged along a particular interface between dielectric ceramic layers 10. FIG. 3 illustrates a state in which an end edge of the internal electrode 11 is exposed onto the end surface 8 of the component body 2. In the component body 2, the internal electrodes 11 whose end edges are exposed onto the end surface 8 and the internal electrodes 11 whose end edges are exposed onto the end surface 9 are alternately disposed.

Not only is the external electrode 3 disposed on the pair of end surfaces 8 and 9 such that the exposed end edges of the internal electrodes 11 are covered therewith, but also the external electrode 3 is arranged so as to intrude into portion adjacent to each of the end surfaces 8 and 9. The portion is part of each of the principal surfaces 4 and 5 and part of each of the side surfaces 6 and 7. The external electrode 3 is preferably formed by directly plating the surface of the component body 2.

A characteristic configuration of the electronic component of the first preferred embodiment will be described below.

In the surface of the component body 2, a bump 12 is provided in a position where a particular region is partitioned. The external electrode 3 should be formed in the particular region. As illustrated in FIG. 4, an end edge 13 of the external electrode 3 is located in the bump 12. More particularly, the bump 12 is formed while a wall surface 14 substantially perpendicularly rises from the particular region of the component body 2 to a predetermined height H. The bump 12 is arranged on the principal surfaces 4 and 5 and the side surfaces 6 and 7 so as to extend around the component body 2.

Preferably, the height H of the wall surface 14 in the bump 12 is in a range of about 2 μm to about 200 μm, for example. The height H is exaggeratingly illustrated in FIGS. 1 to 3. An actual upper limit of the height H may be appropriately set within the upper limit of about 200 μm, for example, according to dimensions or the standard of the electronic component. For example, for the two-terminal chip component having the rectangular solid shape like the electronic component 1, desirably the height H of the bump is limited to about 1/20 or less of the thickness. The same holds true for a depth D in a second preferred embodiment.

First the component body 2 in which the bump 12 is provided is prepared in order to produce the electronic component 1.

Then a plating process is performed. In the plating process, the exposed end edge of the internal electrode 11 is covered by directly plating the surface of component body 2, and a plating film constituting the external electrode 3 is deposited on a portion adjacent to each of the end surfaces 8 and 9. The portion is part of each of the principal surfaces 4 and 5 and part of each of the side surfaces 6 and 7. Either electrolytic plating or electroless plating may be adopted in the plating process.

In the plating process, the plating film constituting the external electrode 3 starts to deposit from the exposed end edge of the internal electrode 11, the plating deposits depositing on the exposed end edge of the internal electrode 11 grow so as to form a bridge therebetween while the exposed end edge of each of the internal electrodes 11 is covered therewith, and the plating deposits are continuously extended on the end surfaces 8 and 9.

When the plating treatment is continued, the plating film grows toward the bump 12 to form a turning portion 16 in a portion adjacent to each of the end surfaces 8 and 9. The portion is part of each of the principal surfaces 4 and 5 and part of each of the side surfaces 6 and 7. The growth of the plating film is substantially stopped or delayed in the bump 12. Accordingly, when the plating process is ended at this stage, the end edge of the plating film constituting the external electrode 3 can be stably located in the bump 12. Even if the time the plating process is ended is not strictly controlled, the position of the end edge of the plating film can be accurately controlled, and therefore dimensional accuracy of the turning portion 16 can be enhanced in the turning portion of the plating film constituting the external electrode 3.

Although the reason the growth of the plating film is substantially stopped or delayed in the bump 12 is not clear, this is attributed to the following fact. That is, in the bump 12, the growth direction of the plating film is bent twice at substantially right angle within a restricted distance, thereby substantially stopping or delaying the growth of the plating film.

Figure 5:
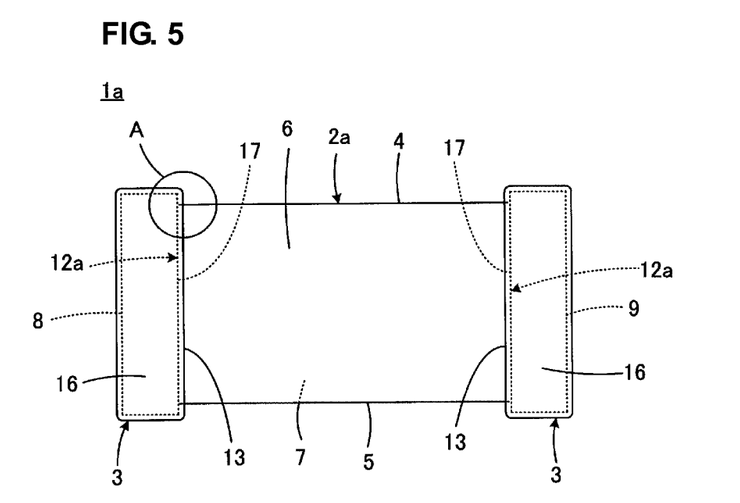
FIG. 5 is a front view illustrating an electronic component according to a second preferred embodiment of the invention.
Figure 6:
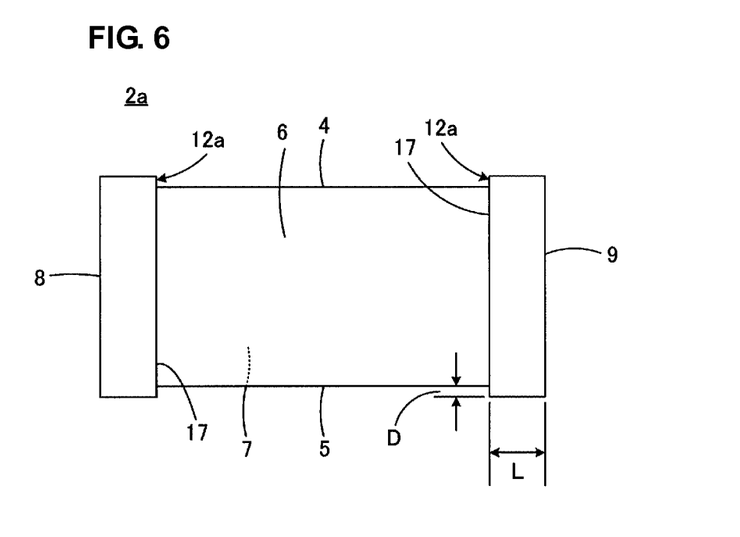
FIG. 6 is a front view illustrating a component body included in the electronic component of FIG. 5.
Figure 7:
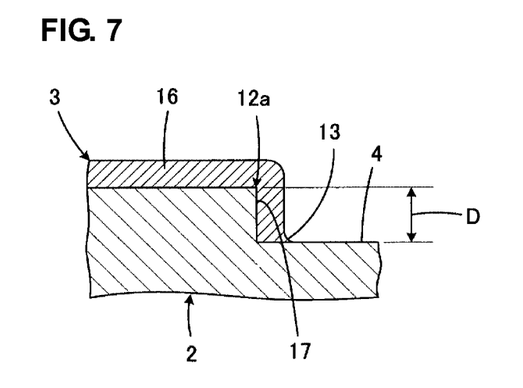
FIG. 7 is an enlarged sectional view of a portion A of FIG. 5.

FIGS. 5 to 7 illustrate an electronic component according to a second preferred embodiment of the present invention. FIG. 5 corresponds to FIG. 1, FIG. 6 corresponds to FIG. 2, and FIG. 7 corresponds to FIG. 4. In FIGS. 5 to 7, the element similar to that of FIGS. 1, 2, and 4 is designated by the same reference numeral, and the overlapping description is not given.

In the second preferred embodiment, a bump 12a provided in a component body 2a included in the electronic component 1a is formed while a wall surface 17 substantially perpendicularly falls to a predetermined depth D from a region where the external electrode 3 in the surface of the component body 2a should be formed. Other configurations are substantially similar to those of the first preferred embodiment.

As with the first preferred embodiment, the plating film constituting the external electrode 3 starts to deposit from the exposed end edge of the internal electrode 11 (see FIG. 3) while terminating the deposition in the bump 12a, and the plating film is formed on a portion adjacent to each of the end surfaces 8 and 9 such that the exposed end edge of the internal electrode is covered therewith. The portion is part of each of the principal surfaces 4 and 5 and part of each of the side surfaces 6 and 7.

In the plating process for depositing the plating film, as with the first preferred embodiment, the dimensional accuracy of the turning portion 16 of the plating film can be enhanced because the growth of the plating film is substantially stopped or delayed in the bump 12a.

Preferably the depth D of the wall surface 17 in the bump 12a is in a range of about 2 μm to about 200 μm, for example. The depth D is exaggeratingly illustrated in FIGS. 5 and 6.

Figure 8:
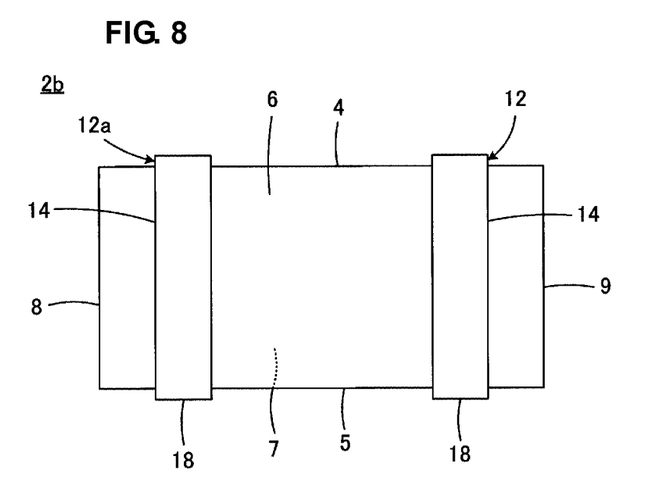
FIG. 8 is a front view illustrating a component body included in an electronic component according to a third preferred embodiment of the present invention, the component body of FIG. 8 corresponding to that of FIG. 2.
Figure 9:
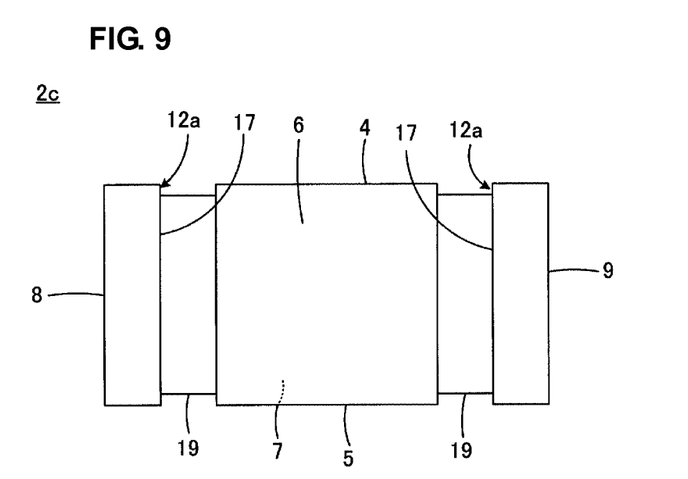
FIG. 9 is a front view illustrating a component body included in an electronic component according to a fourth preferred embodiment of the present invention, the component body of FIG. 9 corresponding to that of FIG. 6.

FIGS. 8 and 9 illustrate electronic components according to third and fourth preferred embodiments of the invention. FIGS. 8 and 9 correspond to FIGS. 2 and 6. In FIGS. 8 and 9, the element similar to that of FIGS. 2 and 6 is designated by the same reference numeral, and the overlapping description is not given.

In the third preferred embodiment of FIG. 8, protruding strips 18 are arranged on the principal surfaces 4 and 5 and the side surfaces 6 and 7 so as to extend around a component body 2b. The bump 12 preferably includes the rising wall surface 14 on one side of the protruding strip 18.

In the fourth preferred embodiment of FIG. 9, grooves 19 are provided on the principal surfaces 4 and 5 and the side surfaces 6 and 7 so as to extend around a component body 2c. The bump 12a is formed with the falling wall surface 17 on one side of the groove 19.

The functions of the bumps 12 and 12a are substantially similar to those of the bumps 12 and 12a in the first and second preferred embodiments.

Although the electronic component 1 or 1a constitutes the laminated ceramic capacitor in the preferred embodiments of the present invention, the electronic components of the preferred embodiments can be also applied to other laminated ceramic electronic components such as a laminated piezoelectric element, a laminated inductor, a laminated thermistor, and a multilayered ceramic substrate. The present invention is not limited to the laminated ceramic electronic component, but the present invention can be also applied to an electronic component in which the electric insulation layer of the laminated structure is made of resin.

The plating film constituting the external electrode is not limited to the plating film having the turning portion extended from the end surface of the component body onto each portion of the principal surfaces and each portion of the side surfaces. For example, the external electrode of the preferred embodiments of the present invention may be formed in a particular region in one plane.

The external electrode of the preferred embodiments of the present invention may include a conductive film thereon by the plating.

Experimental examples performed to confirm the effect of the invention will be described below.

EXPERIMENTAL EXAMPLE 1

A component body was prepared to form a laminated ceramic capacitor having a length of 1.0 mm, a width of 0.5 mm, and a thickness of 0.5 mm. Referring to FIG. 2, the bumps 12 having the rising wall surfaces 14 were formed in the component body 2. The bump 12 was located in the distance L of 250 μm from each of the end surfaces 8 and 9, and the wall surface 14 had the height H of 2 μm.

The 100 component bodies were put in a barrel having a volume of 320 $cm^3$, and 80-ml dummy ball having diameter of 0.7 mm was put as a medium in the barrel. Under the conditions of a barrel revolving speed of 12 rpm and a current of 10 A, copper electrolytic plating was performed using a copper pyrophosphate strike bath having a P ratio of 14.

In the electrolytic plating, the copper plating film started to grow from the exposed end edge of the internal electrode, and the whole surface of the end edge of the component body was covered with the copper plating film. Then the copper plating film grew on a portion adjacent to each end surface. The portion was part of each of the principal surfaces and part of each of the side surfaces. The plating growth substantially stopped from the bump of the termination point at the time 200 minutes passed. Therefore, the plating film constituting the external electrode was formed while the good dimensional accuracy was able to be ensured in the turning portion on the principal surface and the side surface.

EXPERIMENTAL EXAMPLE 2

A component body similar to that of Experimental Example 1 was prepared. Referring to FIG. 6, the bumps 12a having the falling wall surfaces 17 were formed in the component body 2a. The bump 12a was located in the distance L of 250 μm from each of the end surfaces 8 and 9, and the wall surface 17 had the depth of 30 μm.

Then the plating was performed by the method similar to that of Experimental Example 1. As a result, as with Experimental Example 1, the plating film constituting the external electrode started to deposit from the exposed end edge of the internal electrode while terminating the deposition in the bump, and the plating film was able to be formed while the good dimensional accuracy was ensured in the turning portion.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A method for producing an electronic component, the electronic component including a component body and an external electrode formed on a particular region in a surface of the component body, the electronic component producing method comprising:

a step of preparing the component body in which a bump is provided in a position, the particular region where the external electrode should be formed being partitioned at the position; and a plating step of directly plating the surface of the component body to deposit a plating film in the particular region, the plating film constituting the external electrode; wherein the plating step includes a step of growing the plating film toward the bump and a step of substantially stopping or delaying the growth of the plating film in the bump.

2. The electronic component producing method according to claim 1, wherein the component body is formed into a substantially rectangular solid, the component body includes a pair of principal surfaces opposed to each other, a pair of side surfaces opposed to each other, and a pair of end surfaces opposed to each other, the component body has a laminated structure including a plurality of electric insulation layers and an internal electrode, the electric insulation layers being laminated while extended in a direction of the principal surface, the internal electrode being formed along a particular interface between the electric insulation layers, the end edge of the internal electrode is exposed onto at least one of the end surfaces of the component body, the bump is formed on the principal surface and the side surface so as to extend around the component body, and wherein in the plating process, the plating film starts to deposit from the exposed end edge of the internal electrode while terminating the deposition in the bump, the exposed end edge of the internal electrode is covered with the plating film, and the plating film is formed on the pair of end surfaces and a portion adjacent to the end surfaces, the portion being part of each of the principal surfaces and part of each of the side surfaces.

* * * * *